United States Patent
Jarquin Arroyo et al.

(10) Patent No.: US 11,308,363 B2
(45) Date of Patent: Apr. 19, 2022

(54) DEVICE AND METHOD FOR TRAINING AN OBJECT DETECTION MODEL

(71) Applicant: Intel Corporation, Santa Clara, CA (US)

(72) Inventors: Julio Jarquin Arroyo, Karlsruhe (DE); Kay-Ulrich Scholl, Malsch (DE)

(73) Assignee: INTEL CORPORATION, Santa Clara, CA (US)

( * ) Notice: Subject to any disclaimer, the term of this patent is extended or adjusted under 35 U.S.C. 154(b) by 73 days.

(21) Appl. No.: 16/830,447

(22) Filed: Mar. 26, 2020

(65) Prior Publication Data

US 2020/0226426 A1     Jul. 16, 2020

(51) Int. Cl.
*G06K 9/62* (2006.01)
*G06N 3/08* (2006.01)

(52) U.S. Cl.
CPC ........... *G06K 9/6262* (2013.01); *G06K 9/629* (2013.01); *G06K 9/6257* (2013.01); *G06N 3/08* (2013.01); *G06K 2209/21* (2013.01)

(58) Field of Classification Search
CPC .... G06K 9/6262; G06K 9/6257; G06K 9/629; G06K 2209/21; G06N 3/08; G06N 20/00; G06N 3/0454
USPC ....................................................... 382/157
See application file for complete search history.

(56) References Cited

U.S. PATENT DOCUMENTS

| | | | |
|---|---|---|---|
| 6,151,539 A | 11/2000 | Bergholz et al. | |
| 6,598,195 B1 | 7/2003 | Adibhatla et al. | |
| 9,221,396 B1 | 12/2015 | Zhu et al. | |
| 2003/0186663 A1* | 10/2003 | Chen | G06T 5/40 |
| | | | 455/226.3 |
| 2012/0265471 A1 | 10/2012 | Hess et al. | |
| 2014/0032167 A1 | 1/2014 | Mayer et al. | |
| 2014/0142800 A1 | 5/2014 | Zeng et al. | |
| 2014/0195199 A1 | 7/2014 | Uluyol | |
| 2015/0142244 A1 | 5/2015 | You et al. | |
| 2017/0008487 A1 | 1/2017 | Ur et al. | |
| 2017/0045362 A1 | 2/2017 | Song et al. | |
| 2017/0045474 A1 | 2/2017 | Buchholz et al. | |
| 2017/0123428 A1 | 5/2017 | Levinson et al. | |
| 2017/0169627 A1 | 6/2017 | Kim et al. | |

(Continued)

FOREIGN PATENT DOCUMENTS

| | | | |
|---|---|---|---|
| EP | 2604478 A1 | 6/2013 | |
| EP | 3525131 A1 | 8/2019 | |

(Continued)

OTHER PUBLICATIONS

European Search Report issued for the European Patent Application No. 20207152.8, dated May 4, 2021, 7 pages (for informational purposes only).

(Continued)

*Primary Examiner* — Juan A Torres
(74) *Attorney, Agent, or Firm* — Viering, Jentschura & Partner mbB

(57) ABSTRACT

A training device may include one or more processors configured to generate, using a data augmentation model, augmented sensor data for sensor data, the sensor data provided by a plurality of sensors, wherein the augmented sensor data comprise error states of one or more sensors of the plurality of sensors providing the sensor data, and to train an object detection model based on the augmented sensor data.

20 Claims, 9 Drawing Sheets

(56) References Cited

U.S. PATENT DOCUMENTS

| | | | | |
|---|---|---|---|---|
| 2018/0349784 | A1* | 12/2018 | Zheng | G06K 9/00791 |
| 2019/0065637 | A1* | 2/2019 | Bogdoll | G06N 20/00 |
| 2019/0354817 | A1* | 11/2019 | Shlens | G06K 9/6255 |
| 2020/0027442 | A1* | 1/2020 | Mathur | G06N 3/0454 |
| 2020/0090322 | A1* | 3/2020 | Seo | G06K 9/036 |
| 2020/0117953 | A1* | 4/2020 | Cooper | G06K 9/6255 |
| 2020/0218979 | A1* | 7/2020 | Kwon | B60W 60/0011 |
| 2020/0401136 | A1* | 12/2020 | Iandola | G05D 1/0088 |

FOREIGN PATENT DOCUMENTS

| | | |
|---|---|---|
| KR | 101470190 A | 12/2014 |
| WO | 2019017935 A1 | 1/2019 |
| WO | 2019066841 A1 | 4/2019 |

OTHER PUBLICATIONS

Realpe et al.: "A Fault Tolerant Perception system for autonomous vehicles"; 35th Chinese Control Conference; Jul. 2016; 7 pages.

Arnold et al.: "A Survey on 3D Object Detection Methods for Autonomous Driving Applications"; IEEE Transactions on Intelligent Transportation Systems; 2019; 14 pages.

Ngiam et al.: "Multimodal Deep Learning"; Proceedings of the 28th International Conference on Machine Learning; 2011; 8 pages.

Liu et al.: "Learning End-to-end Multimodal Sensor Policies for Autonomous Navigation"; 1st Conference on Robot Learning; 2017; 13 pages.

Nitsch et al.: "Object Classification Based on Unsupervised Learned Multi-Modal Features For Overcoming Sensor Failures"; International Conference on Robotics and Automation; May 2019; pp. 4369-4375.

Gustafsson et al.: "Evaluating Scalable Bayesian Deep Learning Methods for Robust Computer Vision"; arXiv e-prints; Jun. 2019; 31 pages.

Kendall et al.: "What Uncertainties Do We Need in Bayesian Deep Learning for Computer Vision?"; 31st Convention on Neural Inforamtion Processing Systems; 2017.

Geiger et al.: "KITTI object detection evaluation 2017" (retrieved from http://www.cvlibs.net/datasets/kitti/eval_object.php?obj_benchmark=3d on Apr. 21, 2020).

NuScenes; Object Detection Benchmark (retrieved from https://www.nuscenes.org/objectdetection?externalData=all&mapData=all&modalities=Any on Apr. 21, 2020).

International Search Report based on PCT Application No. PCT/US2017/042849 (4 pages) dated Apr. 9, 2018 (for reference purpose only).

International Search Report based on PCT Application No. PCT/US2017/053912 (3 pages) dated Jun. 26, 2018 (for reference purpose only).

* cited by examiner

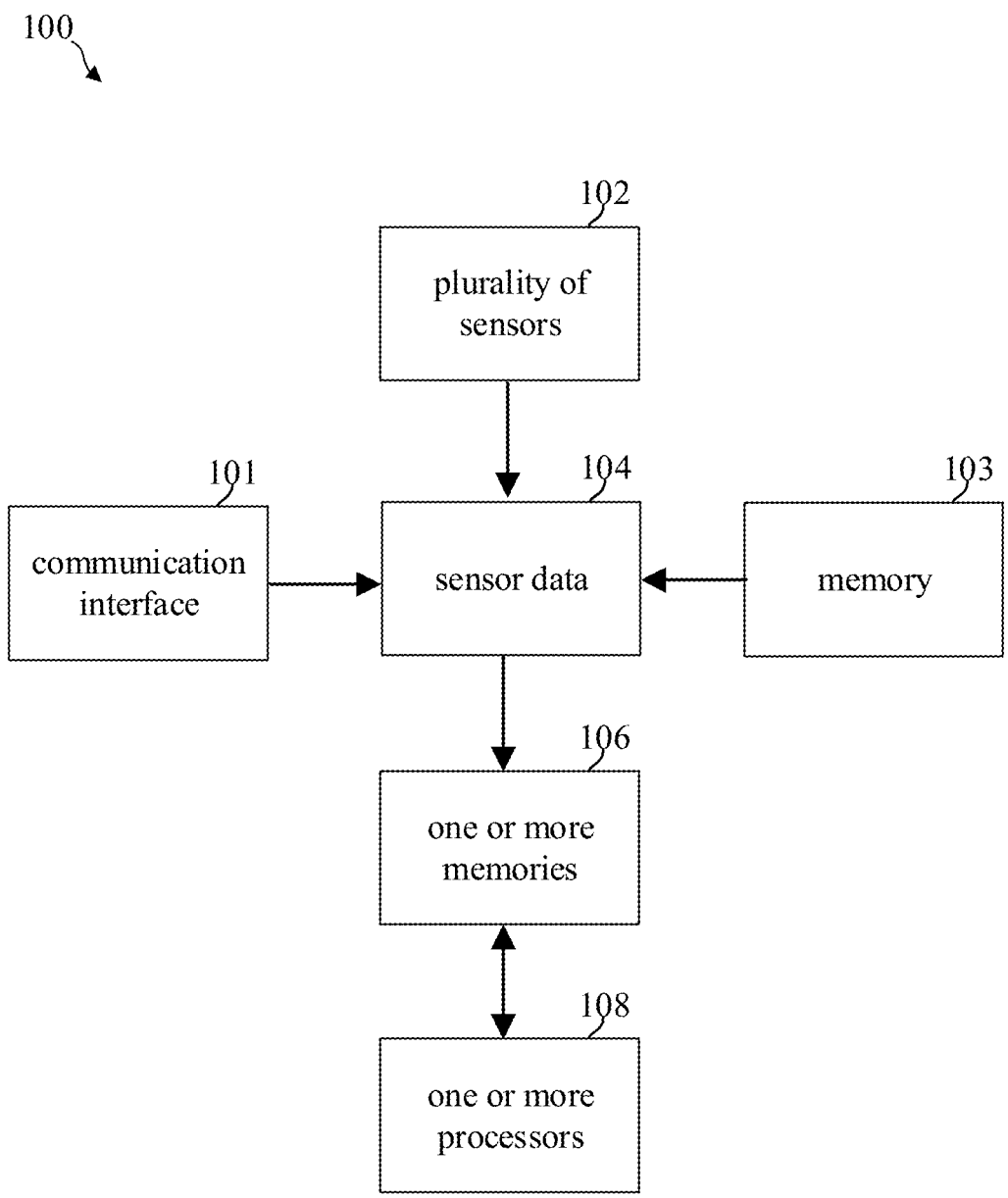

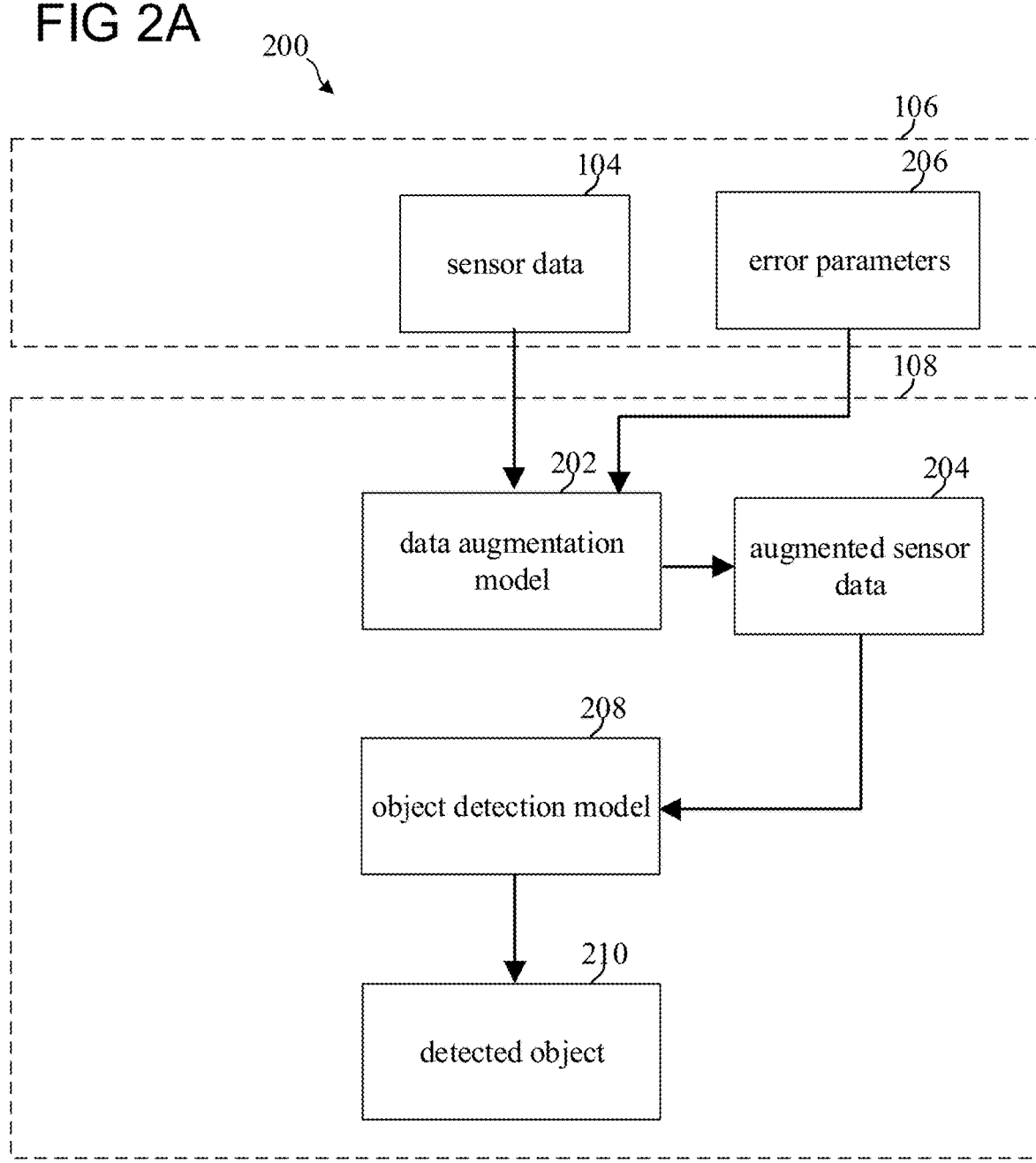

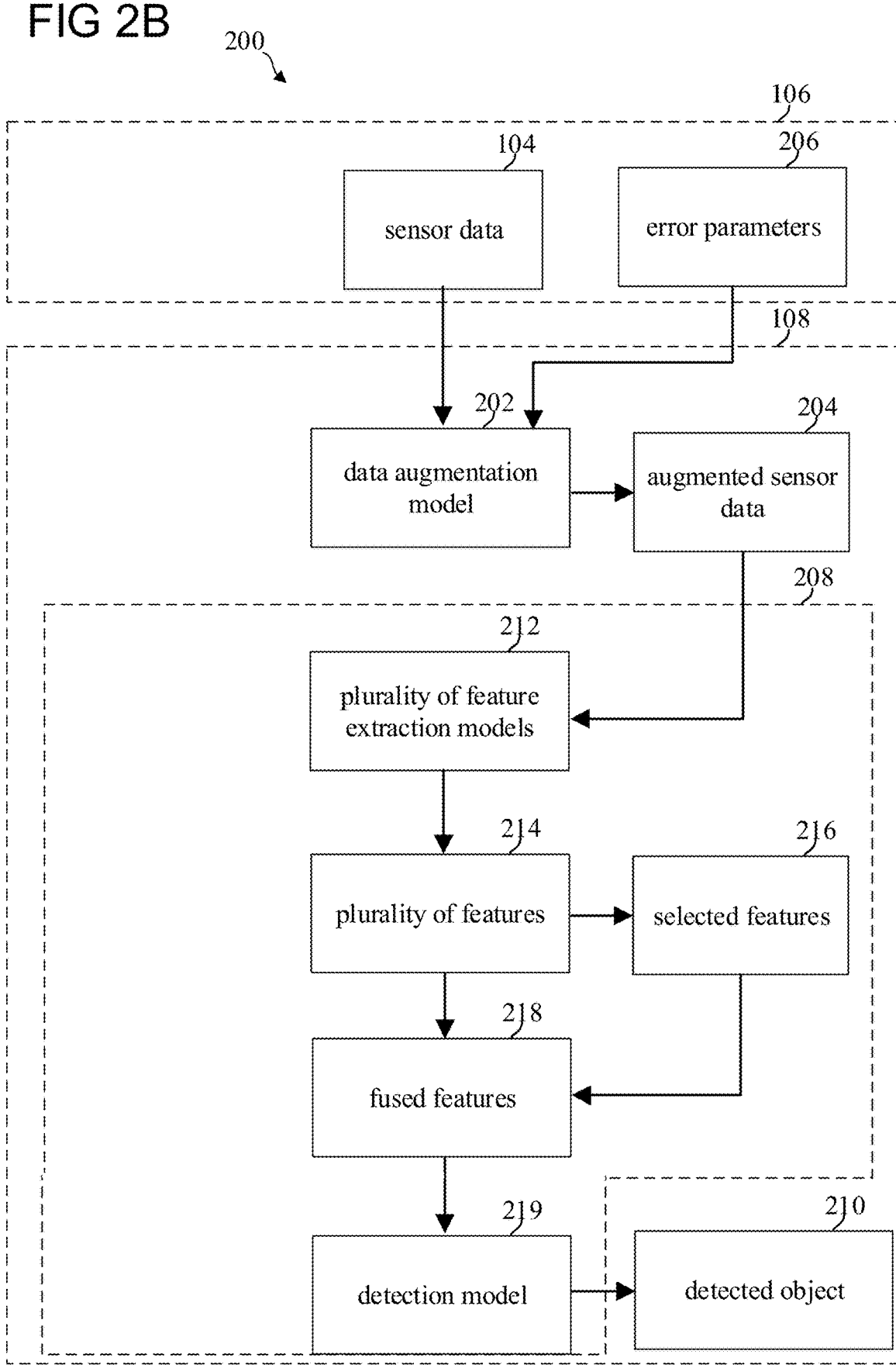

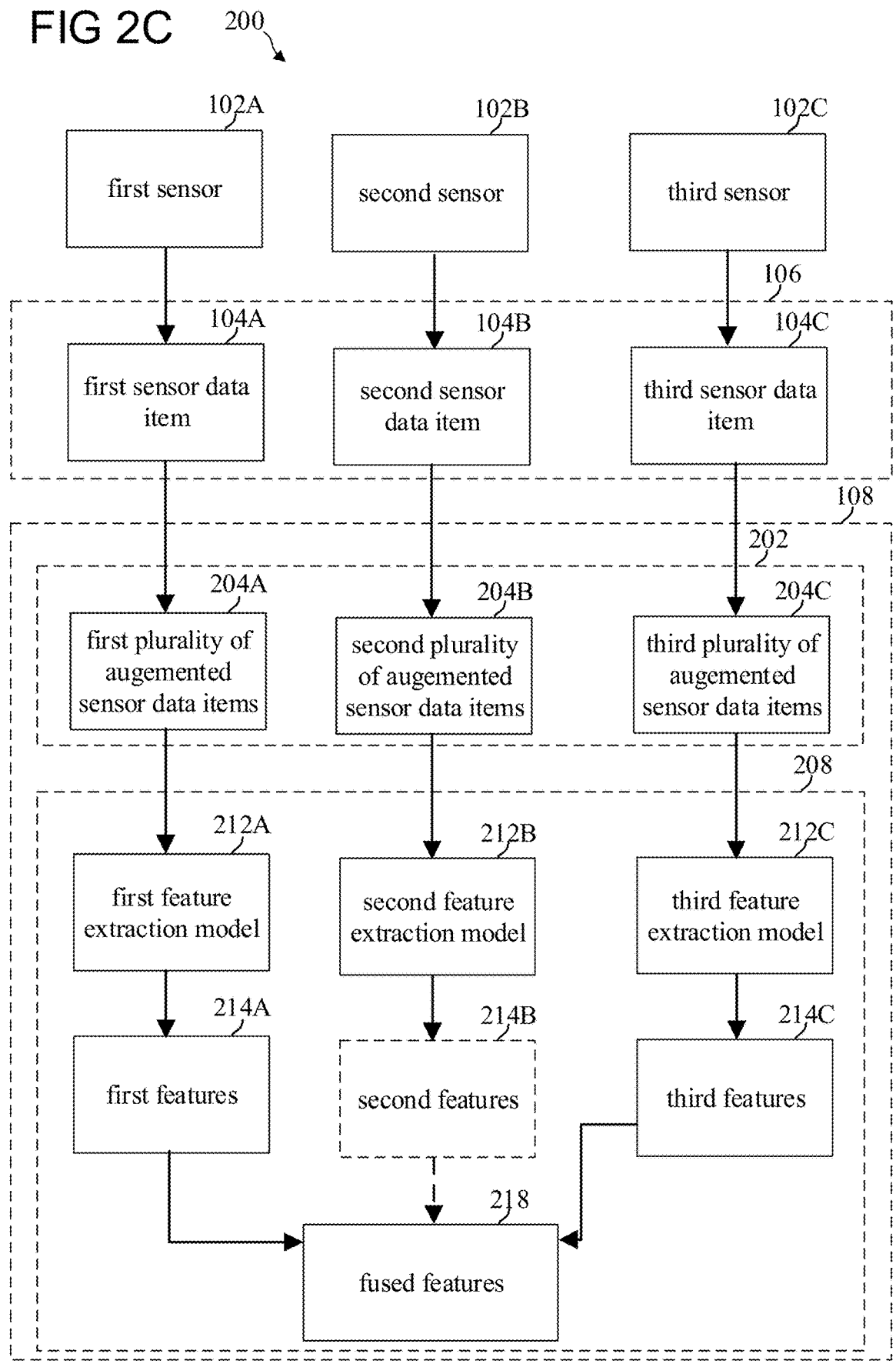

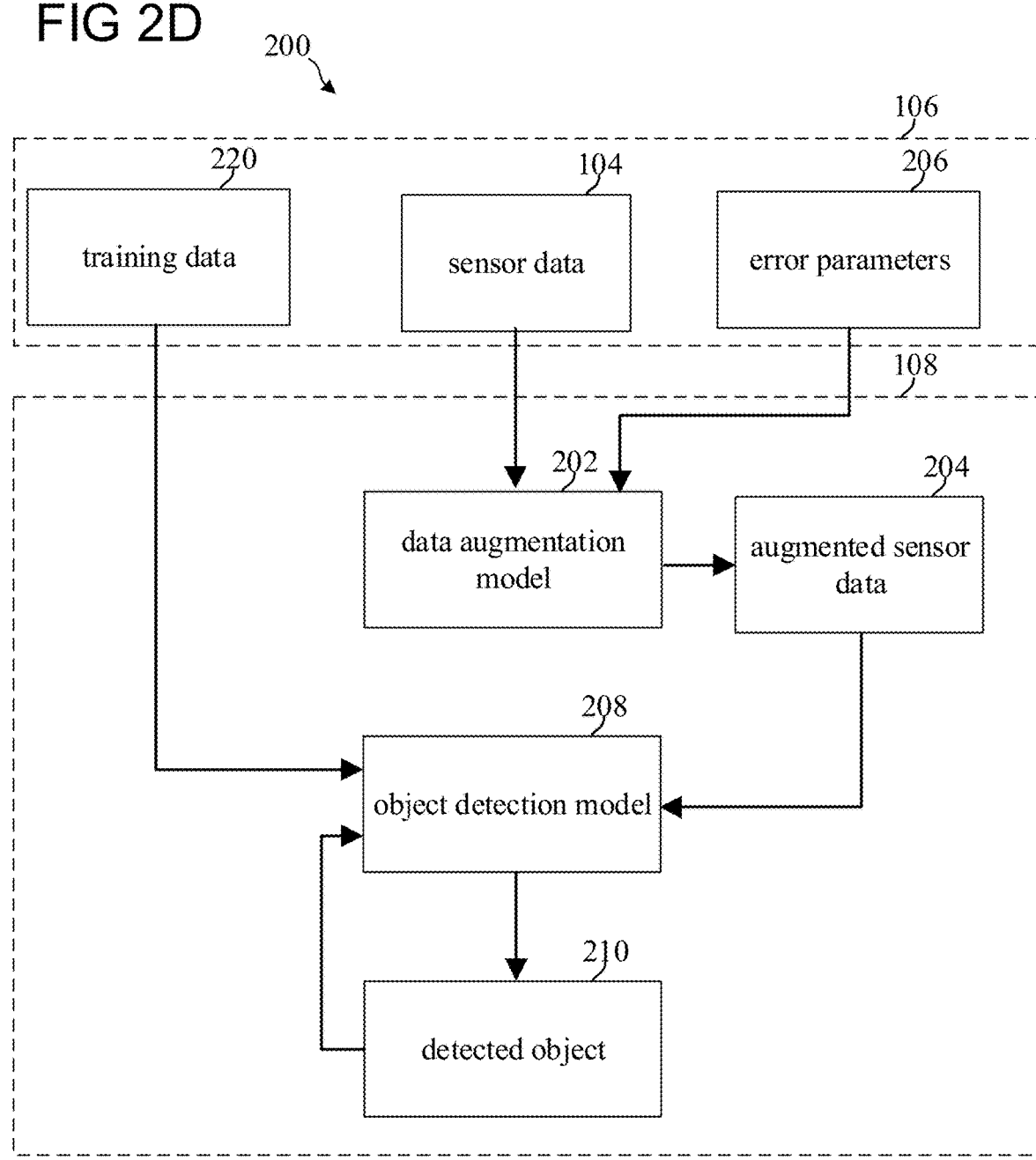

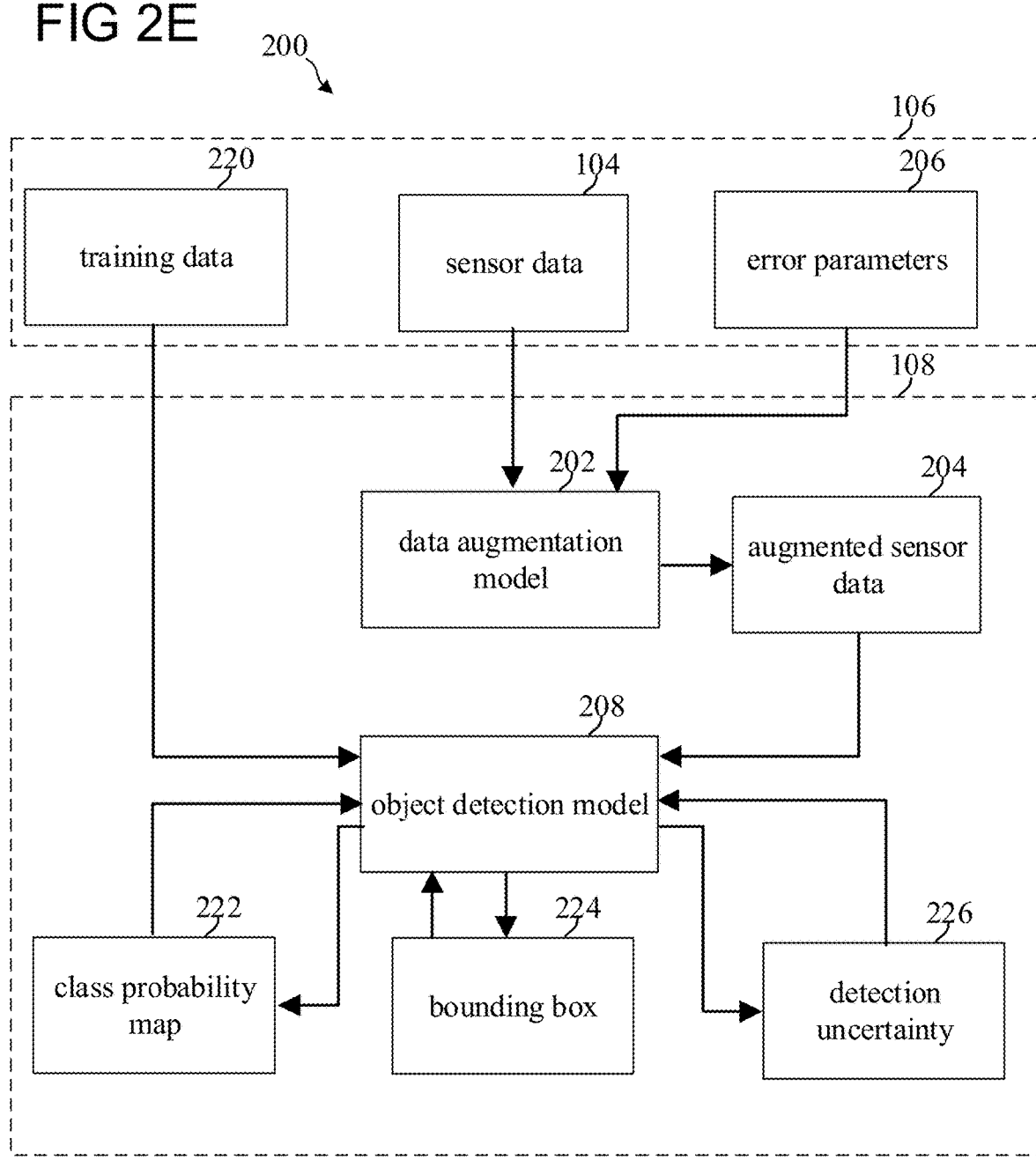

DEVICE AND METHOD FOR TRAINING AN OBJECT DETECTION MODEL

TECHNICAL FIELD

Various aspects of this disclosure generally relate to object detection systems.

BACKGROUND

In general, a system may include sensors to acquire data, which may be processed by a model in order to extract information and to control the system in accordance with the extracted information. For example, autonomous driving utilizes reliable driving control and safety systems that process data acquired at a vehicle. Using data acquired at the vehicle, which may include data about the vehicle's environment or data about the vehicle itself, the vehicle may alter its movements, modify its positioning with respect to external elements, and/or respond to newly detected events. However, a sensor may provide faulty data due to erroneous readings, bad calibration, physical failures, weather conditions (e.g. due to moisture), etc. Furthermore, a sensor may be nonworking (e.g., broken). Therefore, it may be necessary that a model provides reliable data even in the case of faulty input data and/or malfunctioning sensors. Additionally, autonomous vehicles may be configured to communicate with other devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 1 shows a system in accordance with various aspects of the disclosure;

FIG. 2A to 2E show examples of a processing system with object detection in accordance with various aspects of the disclosure;

DESCRIPTION

Figure 3:
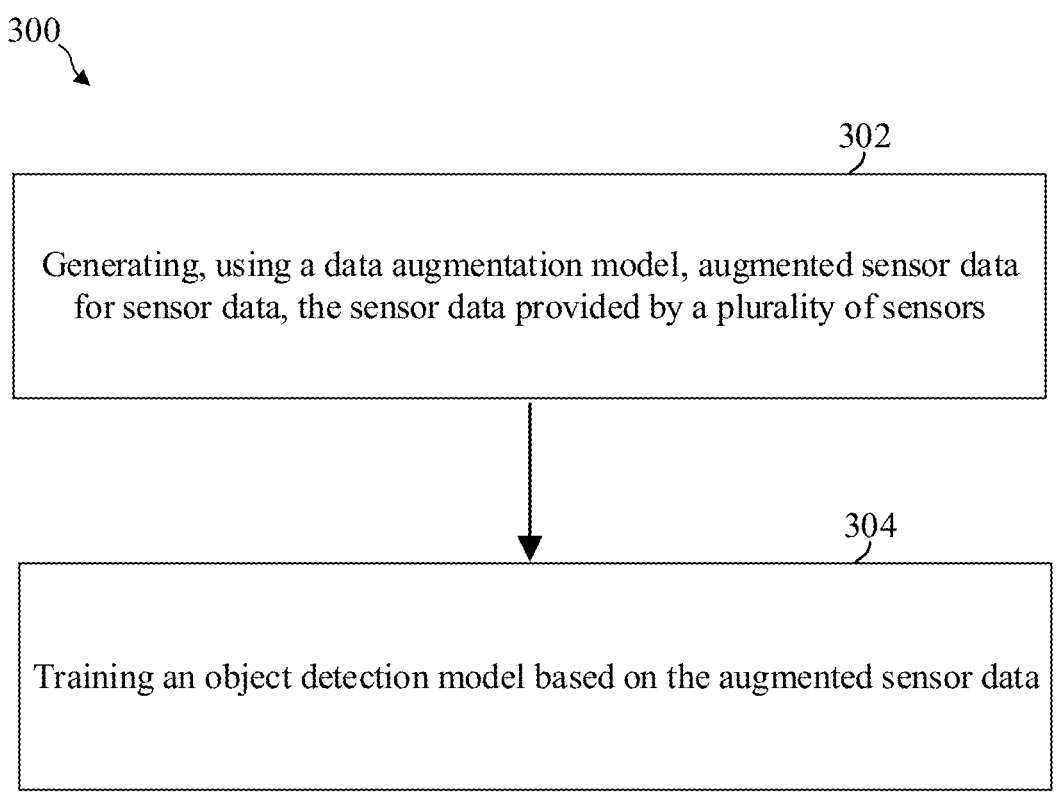
FIG. 3 shows an exemplary method of training an object detection model in accordance with various aspects of the disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., among others in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, among others. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile memory, for example a DRAM (Dynamic Random Access Memory), or non-volatile memory, including random access memory (RAM), read-only memory (ROM), flash memory, solid-state storage, magnetic tape, hard disk drive, optical drive, PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) a PCRAM (Phase Change Random Access Memory), among others, or any combination thereof. Registers, shift registers, processor registers, data buffers, among others, are also embraced herein by the term memory. The term "software" refers to any type of executable instruction, including firmware.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver input or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data, among others. A classification model as described herein may, for example, classify certain driving conditions and/or environmental conditions, such as weather conditions, road conditions, among others. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others. The neural network may include any number of layers. The training of the neural network (e.g., adapting the layers of the neural network) may use or may be based on any kind of training principle, such as backpropagation (e.g., using the backpropagation algorithm).

Throughout the disclosure, the following terms may be used as synonyms: data, sensor data, sensor information, detected information, measured information, sensor parameter, dataset, collection of data, multimodal data, multimodal dataset. These terms may correspond to groups of values used by one or more models system according to the manners described herein for detecting one or more objects to, for example, operate a system, such as a production system or a vehicle, based on the detected one or more objects.

Furthermore, throughout the disclosure, the following terms may be used as synonyms: data item, datum, piece of information, individual data, individual datum, single data, single datum, piece of data and may correspond to a specific group of the groups of values.

Furthermore, throughout the disclosure, the following terms may be used as synonyms: detected object, identified object, perceived object, marked object, detected object information, identified object information, perceived object information and may correspond to specific values determined via a model.

Furthermore, throughout the disclosure, the following terms may be used as synonyms: augmented data, augmented sensor data, plurality of augmented sensor data items, plurality of augmented data, synthetic sensor data, synthetic data and may correspond to synthetic data determined via a model for sensor data.

Furthermore, throughout the disclosure, the following terms may be used as synonyms: faulty sensor data, faulty data, faulty input, erroneous sensor data, erroneous data, erroneous input and may correspond to data that may be provided by a malfunctioning, damaged or defective sensor.

Furthermore, throughout the disclosure, the terms control system and safety system may be used as synonyms.

For example, in autonomous driving, to control an autonomous vehicle, it may be advantageous to detect objects in the surrounding of the vehicle using various sensors. However, a sensor may provide faulty data due to erroneous readings, bad calibration, physical failures, weather conditions (e.g. due to moisture), etc. Furthermore, a sensor may be nonworking (e.g., broken). According to various aspects, a device and a method are provided for training an object detection model such that the trained object detection model is capable to provide reliable data (e.g., to reliable detect an object) even in the case of faulty input data and/or nonworking sensors.

FIG. 1 shows a system 100 in accordance with various aspects of the disclosure. The system 100 may include a plurality of sensors 102. The plurality of sensors 102 may include one or more data acquisition devices, one or more position devices which may include components and circuitry for receiving and determining a position based on a Global Navigation Satellite System (GNSS) and/or a Global Positioning System (GPS), and/or one or more measurement sensors, e.g. speedometer, altimeter, gyroscope, velocity sensors, etc., and/or any combination of these devices, among others.

The plurality of sensors 102 may be configured to provide sensor data 104. For example, each sensor of the plurality of sensors 102 may be configured to provide a sensor data item. Thus, the sensor data 104 may include a plurality of sensor data items, wherein each sensor data item of the plurality of sensor data items is associated with one sensor of the plurality of sensors 102. Furthermore, the system 100 may include a communication interface 101. The communication interface 101 may be configured to provide one or more sensor data items provided by one or more sensors (e.g., sensor external to the system 100). The communication interface may be based on any kind of communication, such as V2X communication. Furthermore, the system 100 may include a memory 103, wherein the memory 103 may store one or more sensor data items. The memory 103 may be included in the device 100 or may be a cloud memory. According to various aspects, the cloud memory 103 may store sensor data items and the system 100 may receive the stored sensor data items via the communication interface 101.

In the following, the sensor data 104 will be described as provided by the plurality of sensors 102. Please note, that one or more sensor data items may be provided via the communication interface 101, by the memory 103 or via any other way (e.g., any type of device capable to provide sensor data items).

According to various aspects, the sensor data 104 may be pre-processed to provide sensor-based data, for example by a mathematical model and/or a neural network. For example, the system 100 may be a vehicle or may be included in a vehicle and the one or more sensors 102 may include one or more of a global positioning sensor, an odometry sensor, and/or a visual odometry sensor, among others. The pre-processing of the sensor data may include an ego-position determination of the vehicle, an image-based feature detection, among others. For example, information about an ego-position determination of another vehicle may be provided via the communication interface 101. Sensor-based data may be provided by any other kind of pre-processing of the sensor data 104.

The sensor data 104, as described in the following, are considered to also include any kind of pre-processed sensor-based data.

The sensor data 104 may include information about at least one object (for example exactly one object, for example more than one object, for example a plurality of objects). One or more sensor data items of the plurality of sensor data items may include information about the at least one object. For example, each sensor data item of the plurality of sensor data items may include information about the at least one object.

Each sensor data item of the plurality of sensor data items may include a plurality of elements. One or more elements of the plurality of elements of a sensor data item may be associated with the at least one object. Illustratively, one or more elements of a sensor data item may describe the at least one object. For example, a sensor data item may include a plurality of objects and each object of the plurality of objects may be described by one or more elements of the plurality of elements.

According to various aspects, a sensor data item may be or may include an image provided by a sensor of the plurality of sensors, such as a camera. Each element of the plurality of elements of the sensor data item may be a pixel of a plurality of pixels of the image and one or more pixels may be associated with the at least one object.

According to various aspects, a sensor data item may be or may include a point cloud provided by a sensor of the plurality of sensors, such as a LIDAR sensor or a radar sensor. Each element of the plurality of elements of the sensor data item may be a point of a plurality of points of the point cloud and one or more points may be associated with the at least one object. For example, a point cloud may include three-dimensional information, confidence information, intensity information (e.g., a signal strength), information about a relative speed, among others.

According to various aspects, a sensor data item may be or may include a target list provided by a sensor of the plurality of sensors, such as a radar sensor. Each element of the plurality of elements of the sensor data item may be a target item of a plurality of target items of the target list and one or more target items may be associated with the at least one object.

Data acquisition devices may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras (e.g., active infrared cameras, e.g., passive infrared cameras), stereo cameras, time-of-flight cameras, etc.), charge coupling devices (CCDs), radar sensors providing image-like information, or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. The data acquisition devices may be configured to implement pre-processed sensor data, such as radar target lists or LIDAR target lists, in conjunction with acquired data.

Measurement devices may include other devices for measuring parameters of the system 100, such as a velocity sensor (e.g., a speedometer) for measuring a velocity of an object within the system (e.g., a product or a vehicle), odometers, altimeters, thermometers, a humidity sensor (e.g., a hygrometer) for measuring a humidity, a distance meter to measure a roughness, a pressure sensor for measuring a pressure in the surrounding of the system 100, etc. It is appreciated that system 100 may have different measurement devices depending on the type of system it is, such as an autonomous vehicle (e.g., a car, a drone, or a boat) or a production system.

The system 100 may include one or more memories 106. A memory 106 may be any type of memory as described above. A memory device 106 may include a memory which is for example used in the processing carried out by a processor. According to various aspects, the oen or more memories 106 may include the memory 103. The one or more memories 106 may be configured to store the sensor data 104 provided by the plurality of sensors 102.

The system 100 may include one or more processors 108. The one or more processors 108 may be any kind of circuit, i.e. any kind of logic implementing entity, as described above. The one ore more processors 108 may be configured to process the sensor data 104.

The one or more processors 108 may include a data acquisition processor, an application processor, a communication processor, an AI (artificial intelligence) accelerator and/or any other suitable processing device. Each processor of the one or more processors 108 may include various types of hardware-based processing devices. By way of example, each processor may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors disclosed herein may be configured to perform certain functions in accordance with program instructions which may be stored in a memory of the one or more memories 106. In other words, a memory of the one or more memories 106 may store software that, when executed by a processor (e.g., by the one or more processors 108), controls the operation of the system 100. The one or more memories 106 may include any number of random-access memories, read only memories, flash memories, disk drives, optical storage, tape storage, removable storage and other types of storage. Alternatively, each of processors may include an internal memory for such storage.

The data acquisition processor may include processing circuitry, such as a CPU, for processing data acquired by data acquisition devices. For example, if one or more data acquisition devices are image acquisition devices, e.g. one or more cameras, then the data acquisition processor may include image processors for processing image data using the information obtained from the image acquisition devices as an input. The data acquisition processor may therefore be configured to create voxel maps detailing a surrounding of the system 100 based on the data input from the data acquisition devices, i.e., cameras in this example.

An application processor may be a CPU, and may be configured to handle the layers above the protocol stack, including the transport and application layers. The application processor may be configured to execute various applications and/or programs of the system 100 at an application layer of the system 100, such as an operating system (OS), a user interfaces (UI) for supporting user interaction with system 100, and/or various user applications.

FIG. 2A shows an example of a processing system 200 in accordance with various aspects of the disclosure. The processing system 200 may include the one or more memories 106. The one or more memories 106 may store the sensor data 104 provided by the plurality of sensors 102. The processing system 200 may include the one or more processors 108.

According to various aspects, the one or more processors 108 may be configured to implement an data augmentation model 202. The data augmentation model 202 may be a mathematical model describing the process of error generation. The data augmentation model 202 may be a classic mathematical model or any kind of machine learning model (e.g., a neural network) as described above.

The data augmentation model 202 may be configured to provide (e.g., to generate) augmented sensor data 204 for the sensor data 104. The augmented sensor data 204 may include a plurality of augmented sensor data items. The data augmentation model 202 may be configured to provide one or more augmented sensor data items of the plurality of augmented sensor data items 204 for a sensor data item of the plurality of sensor data items, for example, for each sensor data item of the plurality of sensor data items. Thus, each augmented sensor data item of the plurality of augmented sensor data items 204 may be associated to a sensor data item and, hence, to a sensor of the plurality of sensors 102.

The augmented sensor data 204 may include error states of one or more sensors of the plurality of sensors 102. Illustratively, an augmented sensor data item may be associated to an error of a sensor. For example, a sensor data item may be an image provided by an error-free sensor and an augmented sensor data item generated for the sensor data item may be an image that may be provided by a sensor in an erroneous state, such as an image with hidden regions due to, for example, pixel errors. For example, in an erroneous state, the sensor may provide an image with an increased noise level and the augmentation model 216 may provide an augmented image for the error-free image having an increase noise level.

The data augmentation model 202 may be configured to generate the plurality of augmented sensor data items 204 including the error states based on error parameters 206. The error parameters 206 may include any kind of error state of a sensor that may occur. For example, the error parameters 206 may include one or more of weather conditions, an occlusion within the sensor data item, sensor data noise, a sensor saturation, a sensor bias, a drift, and/or a scaling of the sensor data, among others. The error parameters 206 may include a tolerated range for the respective error parameters, such as a tolerated range of sensor data noise. Thus, each error parameter may include a set of tolerated errors. Illustratively, the plurality of augmented sensor data items 204 may be a synthetic set of faulty input data.

The data augmentation model 202 may be configured to generate one or more augmented sensor data items for a sensor data item using an error model. The error model may be configured to generate one or more augmented sensor data items for a sensor data item using the error parameters. The error model, $\mathcal{F}$, may be configured to provide one or more augmented data items for a sensor data item, x, based on the error parameters 206, $\Theta$. Thus, the error model may be described by $\mathcal{F}(\Theta, x)$.

The data augmentation model 202 may be configured to generate, based on the error model, augmented sensor data items for a sensor data item using one or more error parameters of the error parameters 206.

The one or more processors 108 may be configured to implement an object detection model 208. The processing system 200 may be applied to train the object detection model 208. The object detection model 208 may be or may include a neural network. The neural network may be or may include a convolutional neural network. The object detection model 208 may be or may include a region proposal network.

The object detection model 208 may be configured to process the augmented sensor data 204. The object detection model 208 may be configured to detect at least one object 210 within sensor data 104. The object detection model 208 may be configured to provide a detected object 210 within sensor data 104 for the augmented sensor data 204. For example, the sensor data 104 may include information about the at least one object and the object detection model 208 may be configured to provide data describing the at least one object. Illustratively, as an example, a sensor data item of a plurality of sensor data items may be or may include an image showing at least one object, one or more sensor data items of the plurality of sensor data items may include information about the at least one object, the object detection model 208 may detect the at least one object and may provide information describing the at least one detected object 210.

FIG. 2B shows an example of a processing system 200 in accordance with various aspects of the disclosure. In accordance with the example, the processing system 200 may include a plurality of feature extraction models 212.

The one or more processors 108 may be configured to implement the plurality of feature extraction models 212. Each feature extraction model 212 of the plurality of feature extraction models 212 may be associated to at least one sensor of the plurality of sensors 102. For example, a feature extraction model may be associated to more than one sensor of the plurality of sensors. Illustratively, the plurality of sensors 102 may include two or more camera sensors providing images and a feature extraction model may be associated to the two or more camera sensors and may be configured to process the provided images. A feature extraction model of the plurality of feature extraction models 212 may include any kind of model portion of the object detection model 208 (e.g., a neural network portion) that is capable to extract features from data, such as the sensor data 104. For example, a feature extraction model may be based on a machine learning algorithm, a pattern recognition algorithm, an image processing algorithm, etc. A feature extraction model of the plurality of feature extraction models 212 may include a convolutional feature extraction, a spatial point feature extraction, and/or a feature encoder, among others. A feature extraction model of the plurality of feature extraction models 212 may be selected based on the respective associated sensor of the plurality of sensors 102. For example, a sensor data item may include a LIDAR point cloud or a radar point cloud and the feature extraction model processing the respective point cloud may be a spatial point feature extraction model. For example, a sensor data item may include an image and the feature extraction model processing the image may be a convolutional feature extraction model.

The plurality of feature extraction models 212 may be configured to determine a plurality of features 214 for the sensor data 104. According to various aspects, sensor data 104 may include a plurality of sensor data items. Each sensor data item of the plurality of sensor data items may be associated to one sensor of the plurality of sensors 102. Each feature extraction model of the plurality of feature extraction models 212 may be associated to at least one sensor of the plurality of sensors 102. Each feature extraction model of the plurality of feature extraction models 212 may be configured to determine one or more features of the plurality of features 214 for a sensor data item of the plurality of sensor data items associated to a sensor of the plurality of sensors 102. Illustratively, a sensor may provide a sensor data item and a feature extraction model may determine one or more features for the provided sensor data item.

A sensor data item of the plurality of sensor data items may include information about at least one object and the one or more features associated to the sensor data item may describe the at least one object.

The object detection model 208 may be configured to determine fused features 218 for the plurality of features 214. Optionally, the object detection model 208 may be configured to suppress one or more selected features 216 of the plurality of features 214. The one or more selected features 216 may associated to one or more selected sensors of the plurality of sensors 102. For example, the object detection model 208 may be configured to suppress all features of one or more selected sensors. The object detection model 208 may be configured to determine fused features 218 for the plurality of features 214 except for the selected features 216. For example, the object detection model 208 may be configured to select the features 216 associated with one or more selected sensors. Hence, the fused features 218 may include information associated to the sensor data items provided by one or more sensors of the plurality of sensors 102 and may not include information associated selected features 216 of selected sensor data items provided by one or more selected sensors of the plurality of sensors 102.

The object detection model 208 may be configured to select the one or more selected sensors, randomly. For example, the object detection model 208 may be configured to randomly select the one or more selected sensors based on a Bernoulli distribution, a Binomial distribution, or a Possion binomial distribution, among others.

According to various aspects, a feature extraction model of the plurality of feature extraction models 212 may be configured to determine a feature vector for augmented sensor data item. For example, the plurality of feature extraction models may be configured to determine a plurality of feature vectors. A feature vector may be or may include a set of features. Thus, a feature vector may be associated to an augmented sensor data item and a sensor of the plurality of sensors 102 and may include one or more features of the plurality of features 214.

The object detection model 208 may be configured to select one or more feature vectors associated to one or more sensors of the plurality of sensors 102. The one or more processors 108 may be further configured to determine a fused feature vector for the plurality of feature vectors except for the one or more selected feature vectors. For example, the object detection model 208 may be configured to fuse the plurality of feature vectors 214 except for the one or more selected feature vectors 216 to the fused feature vector 218.

The one or more processors 108 may be configured to concatenate the plurality of feature vectors 214 except for the one or more selected feature vectors 216 to the fused feature vector 218. For example, the one or more processors 108 may be configured to concatenate each feature vector of the plurality of feature vectors 214 except for the one or more selected feature vectors 216 to a fused feature vector 218.

Each feature vector of the plurality of feature vectors 214 may include a plurality of feature values. Each feature value of the plurality of feature values of a feature vector may be associated to at least one feature value of the other feature vectors of the plurality of feature vectors 214.

The object detection model 208 may be configured to select a maximum feature value for each set of associated feature values. Optionally, the object detection model 208 may be configured to select a maximum feature value for each set of associated feature values except for the feature values associated to the one or more selected feature vectors 216. The fused feature vector 218 may be or may include the plurality of maximum feature values.

The object detection model 208 may be configured to determine an average feature value for each set of associated feature values. Optionally, the object detection model 208 may be configured to determine an average feature value for each set of associated feature values except for the feature values associated to the one or more selected feature vectors 216. The fused feature vector 218 may be or may include the plurality of average feature values. The average feature value may be an arithmetic average or a median average.

The object detection model 208 may be configured to process the fused features 218 or the fused feature vector 218 and provide data describing the at least one object. Illustratively, a sensor data item of a plurality of sensor data items may be or may include an image showing at least one object, one or more sensor data items of the plurality of sensor data items may include information about the at least one object. The object detection model 208 may further include a detection model 219. The detection model 219 may be configured to detect the at least one object and/or may provide information describing the at least one detected object 210. The detection model 219 may be a neural network (e.g., a convolutional neural network). The detection model 219 may be or may include a region proposal network and/or a single stage detection network.

FIG. 2C shows an example of a processing system 200 in accordance with various aspects of the disclosure. In accordance with the example, the one or more sensors 102 may include a first sensor 102A, a second sensor 102B, and a third sensor 102C.

The first sensor 102A may be configured to provide a first sensor data item 104A of the plurality of sensor data items 104. The second sensor 102B may be configured to provide a second sensor data item 104B of the plurality of sensor data items 104. The third sensor 102C may be configured to provide a third sensor data item 104C of the plurality of sensor data items 104.

The data augmentation model 202 may be configured to provide a first plurality of augmented sensor data items 204A for the first sensor data item 104A, a second plurality of augmented sensor data items 204B for the second sensor data item 104B, and a third plurality of augmented sensor data items 204C for the third sensor data item 104C.

The plurality of feature extraction models 212 of the object detection model 208 may include a first feature extraction model 212A, a second feature extraction model 212B, and a third feature extraction model 212C. The first feature extraction model 212A may be configured to provide first features 214A (e.g., a first feature vector 214A) for the first plurality of augmented sensor data items 204A. The second feature extraction model 212B may be configured to provide second features 214B (e.g., a second feature vector 214B) for the second plurality of augmented sensor data items 204B. The third feature extraction model 212C may be configured to provide third features 214C (e.g., a third feature vector 214C) for the third plurality of augmented sensor data items 204C.

The object detection model 208 may be configured to determine the fused features 218 (e.g., the fused feature vector 218) for the plurality of features 214 (e.g., the first features 214A, the second features 214B, and the third features 214C). Optionally, the object detection model 208 may be configured to determine the fused features 218 (e.g., the fused feature vector 218) for the plurality of features 214 except for the selected features 216 associated to one or more selected sensors of the plurality of sensors 102. For example, the object detection model 208 may select one or more features associated to the second sensor 102B and may fuse the plurality of features 214 except for the one or more selected features 216. For example, the object detection model 208 may select all features of the second sensor 102B and may fuse the first features 204A and the third features 204C to the fused features 218.

FIG. 2D shows an example of a processing system 200 in accordance with various aspects of the disclosure.

The one or more processors 108 may be configured to train the object detection model 208. The one or more processors 108 may be configured to generate training data. The one or more memories 106 may store training data 220. The one or more processors 108 may be configured to train the object detection model 208 using the training data 220. The one or more processors 108 may be configured to train the object detection model 208 by comparing the training data 220 and the data describing the detected object 210. The training of the object detection model 208 by the one or more processors 108 may be based on any kind of training (e.g., supervised and/or unsupervised) as described above.

As described above, the object detection model 208 may be configured to process the augmented sensor data 204 and the augmented sensor data 204 may include error states of one or more sensors of the plurality of sensors 102.

In consequence of training the object detection model 208 using the plurality of augmented sensor data items as input for the plurality of feature extraction models 212, the trained object detection model 208 is capable to provide reliable (trustworthy, valid) data even in the case of faulty sensor data items provided by an erroneous sensor. The trained object detection model 208 may be capable to provide the data in realtime (e.g., with a delay less than 10 seconds).

According to various aspects, the one or more memories 106 may store the plurality of augmented sensor data items 204.

FIG. 2E shows an example of a processing system 200 in accordance with various aspects of the disclosure.

The object detection model 208 may be configured to determine (e.g., to generate) a class probability map 222 using the fused features 218 (e.g., the fused feature vector 218). The class probability map 222 may include a probability of each class of a plurality of classes for each element of the plurality of elements of at least one data item, such as a sensor data item of the sensor data 104 or an augmented sensor data item of the plurality of augmented sensor data items 204. Illustratively, the sensor data item or the augmented data item may be an image including a plurality of pixels and the class probability map 222 may include a probability of each class of the plurality of classes for each pixel of the plurality of pixels.

The one or more processors 108 may be configured to train the object detection model 208 using the training data 220 and the generated class probability map 222. For example, the training data 220 may include a training class for each element of the plurality of elements of the at least one sensor data item and the one or more processors 108 may be configured to train the object detection model 208 using the plurality of training classes and the generated class probability map 222. Illustratively, the one or more processors 108 may be configured to train the object detection model 208 such that the generated class probability map 222 includes for each element of the plurality of elements the highest probability for the respective training class.

The object detection model 208 may be configured to determine (e.g., to generate) at least one bounding box 224 for at least one sensor data item using the fused features 218 (e.g., the fused feature vector 218). For example, the object detection model 208 may be configured to generate information about the location of a bounding box 224 for at least one sensor data item. The at least one bounding box 224 may, for at least one sensor data item, include one or more elements of the one or more elements associated to the at least one object. For example, the at least one bounding box 224 may include each element of the one or more elements associated to the at least one object for at least one sensor data item. For example, the a sensor data item of the plurality of sensor data items may include a plurality of objects and the object detection model 208 may be configured to generate a bounding box 224 for each object of the plurality of objects. Each bounding box 224 of the plurality of bounding boxes may include one or more elements of the one or more elements associated to the respective object of the plurality of objects. Illustratively, the sensor data item or the augmented data item may be an image including at least one object described by one or more pixels and the at least one bounding box 224 may include one or more pixels (e.g., each pixel) of the one or more pixels associated to the at least one object.

The one or more processors 108 may be configured to train the object detection model 208 using the training data 220 and the generated at least one bounding box 224. For example, the training data 220 may include at least one training bounding box. The at least one training bounding box may include each element of the one or more elements associated to the at least one object. Illustratively, the sensor data item or the augmented data item may be an image including at least one object described by one or more pixels and the one or more processors 108 may be configured to train the object detection model 208 such that a generated bounding box 224 includes each pixel of the one or more pixels associated to the at least one object.

The object detection model 208 may optionally be further configured to determine a detection uncertainty 226. For example, the object detection model 208 may be configured to determine a detection uncertainty 226 of the at least one detected object 210. The determined detection uncertainty 226 may include a mean and/or a variance of the input data (e.g., a mean and/or variance for the detected at least one object in an augmented sensor data item).

The one or more processors 108 may be configured to determine the probability of the at least one detected object 210, y, conditioned on the sensor data, such as a sensor data item x or an augmented sensor data item x, and parameters θ. Thus, the probability may be parametrized by θ. The one or more processors 108 may be configured to determine the conditional distribution p(y|x,θ). For example, the one or more processors 108 may be configured to determine the conditional distribution based on the Gaussian distribution given by equation (1):

$$p(y|x,\theta)=\mathcal{N}(y;\mu_\theta(x),\sigma_\theta^2(x)) \quad (1)$$

$\mu_\theta(x)$ may be the mean for the at least one object y, and $\sigma_\theta^2(x)$ may be the variance for the at least one object y.

The object detection model 208 may be configured to determine the mean and the variance for the at least one object y. For example, the object detection model 208 may be configured to determine the function, $f_\theta(x)$, given by equation (2):

$$f_\theta(x)=[\mu_\theta(x)\log \sigma_\theta^2(x)] \quad (2)$$

The one or more processors 108 may be configured to determine a detection uncertainty loss using the function, $f_\theta(x)$, determined by the object detection model 208 and the mean and variance determined by the one or more processors 108. Illustratively, the one or more processors 108 may be configured to determine training data (given by mean and variance) based on the detected object 210 and the sensor data, and the object detection model 208 may be trained to determine a detection uncertainty 226 described by mean and variance. The one or more processors 108 may be configured to determine a detection uncertainty loss by equation (3):

$$\mathcal{L}_{NN}(\theta) = \frac{1}{N}\sum_{i=1}^{N} \frac{1}{2\sigma(x_i)^2}|y_i - f(x_i)|^2 + \log \sigma(x_i)^2 \quad (3)$$

N may be the number of data items (e.g., sensor data items and/or augmented sensor data items).

The one or more processors 108 may be configured to train the object detection model 208 to reduce (e.g., to minimize) the detection uncertainty loss.

According to various aspects of this disclosure, the trained object detection model 208 may be used in a system, such as the system 100.

FIG. 3 shows a method 300 of training an object detection model in accordance with various aspects of this disclosure.

The method 300 may include generating, using a data augmentation model, augmented sensor data for sensor data, the sensor data provided by a plurality of sensors (in 302). The sensor data may include a plurality of sensor data items and the augmented sensor data may include a plurality of augmented sensor data. Each augmented sensor data item may be associated to a sensor data item. The augmented sensor data may include error states of one or more sensors of the plurality of sensors.

The method 300 may further include training an object detection model based on the augmented sensor data (in 304).

The system 100 may include the trained object detection model 208. For example, the one or more memories 106 may store instruction, which, when executed by the one or more processors 108, implement the trained object detection model 208. The object detection model 208 may have been trained by the training method 300. The system 100 may be capable to detect at least one object based on the sensor data 104 using the trained object detection model 208.

The system 100 may be a production system further including a control system. The control system may be configured to provide control instructions based on the at least one detected object and to control the production system to operate in accordance with the provided control instructions.

Figure 4:
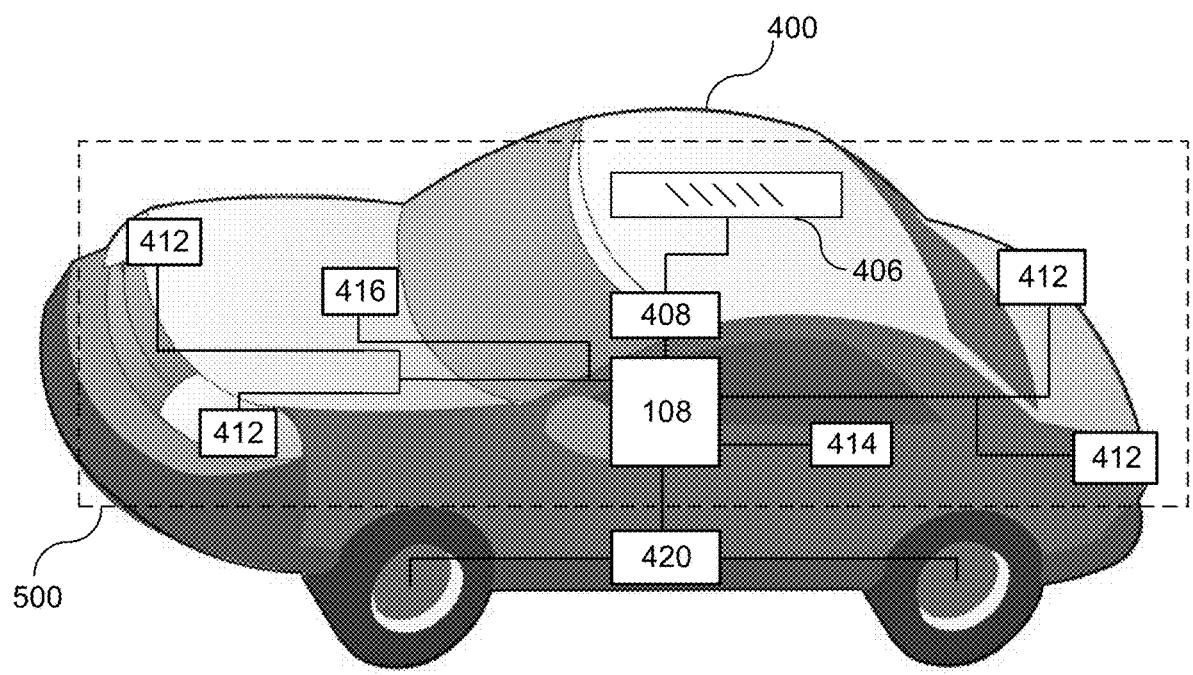
FIG. 4 shows an exemplary autonomous vehicle in accordance with various aspects of the disclosure.

FIG. 4 shows a vehicle 400 including a mobility system 420 and a control system 500 (see also FIG. 5) in accordance with various aspects. It is appreciated that vehicle 400 and control system 500 are exemplary in nature and may thus be simplified for explanatory purposes. For example, while vehicle 400 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 400 may be arranged around a vehicular housing of vehicle 400, mounted on or outside of the vehicular housing, enclosed within the vehicular housing, or any other arrangement relative to the vehicular housing where the components move with vehicle 400 as it travels. The vehicular housing, such as an automobile body, drone body, plane or helicopter fuselage, boat hull, or similar type of vehicular body dependent on the type of vehicle that vehicle 400 is.

In addition to including a control system 500, vehicle 400 may also include a mobility system 420. Mobility system 420 may include components of vehicle 400 related to steering and movement of vehicle 400. In some aspects, where vehicle 400 is an automobile, for example, mobility system 420 may include wheels and axles, a suspension, an engine, a transmission, brakes, a steering wheel, associated electrical circuitry and wiring, and any other components used in the driving of an automobile. In some aspects, where vehicle 400 is an aerial vehicle, mobility system 420 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 400 is an aquatic or sub-aquatic vehicle, mobility system 420 may include any one or more of rudders, engines, propellers, a steering wheel, associated electrical circuitry and wiring, and any other components used in the steering or movement of an aquatic vehicle. In some aspects, mobility system 420 may also include autonomous driving functionality, and accordingly may include an interface with one or more processors 108 configured to perform autonomous driving computations and decisions and an array of sensors for movement and obstacle sensing. In this sense, the mobility system 420 may be provided with instructions to direct the navigation and/or mobility of vehicle 400 from one or more components of the control system 500. The autonomous driving components of mobility system 420 may also interface with one or more radio frequency (RF) transceivers 108 to facilitate mobility coordination with other nearby vehicular communication devices and/or central networking components that perform decisions and/or computations related to autonomous driving.

The control system 500 may include various components depending on the requirements of a particular implementation. As shown in FIG. 4 and FIG. 2, the control system 500 may include the one or more processors 108, the one or more memories 106, an antenna system 406 which may include one or more antenna arrays at different locations on the vehicle for radio frequency (RF) coverage, one or more radio frequency (RF) transceivers 408, one or more data acquisition devices 412, one or more position devices 414 which may include components and circuitry for receiving and determining a position based on a Global Navigation Satellite System (GNSS) and/or a Global Positioning System (GPS), and one or more measurement sensors 416, e.g. speedometer, altimeter, gyroscope, velocity sensors, etc.

The control system 500 may be configured to control the vehicle's 400 mobility via mobility system 420 and/or interactions with its environment, e.g. communications with other devices or network infrastructure elements (NIEs) such as base stations, via data acquisition devices 412 and the radio frequency communication arrangement including the one or more RF transceivers 408 and antenna system 406.

The one or more processors 108 may include the data acquisition processor 514, the application processor 516, the communication processor 518, and/or any other suitable processing device.

A memory of the one or more memories 106 may store software that, when executed by a processor (e.g., by the one or more processors 108), controls the operation of the system, e.g., a driving and/or safety system. A memory of the one or more memories 106 may store one or more databases and image processing software, as well as a trained system, such as a neural network, or a deep neural network, for example.

The data acquisition processor 514 may be configured to create voxel maps detailing the surrounding of the vehicle 400 based on the data input from the data acquisition units 412.

Application processor 516 may interface with communication processor 518 and act as a source (in the transmit path) and a sink (in the receive path) for user data, such as voice data, audio/video/image data, messaging data, application data, basic Internet/web access data, etc. In the transmit path, communication processor 518 may therefore receive and process outgoing data provided by application processor 516 according to the layer-specific functions of the protocol stack, and provide the resulting data to digital signal processor 108. Communication processor 518 may then perform physical layer processing on the received data to produce digital baseband samples, which digital signal processor may provide to RF transceiver(s) 408. RF transceiver(s) 408 may then process the digital baseband samples to convert the digital baseband samples to analog RF signals, which RF transceiver(s) 408 may wirelessly transmit via antenna system 406. In the receive path, RF transceiver(s) 408 may receive analog RF signals from antenna system 106 and process the analog RF signals to obtain digital baseband samples. RF transceiver(s) 408 may provide the digital baseband samples to communication processor 518, which may perform physical layer processing on the digital baseband samples. Communication processor 518 may then provide the resulting data to other processors of the one or more processors 108, which may process the resulting data according to the layer-specific functions of the protocol stack and provide the resulting incoming data to application processor 516. Application processor 516 may then handle the incoming data at the application layer, which can include execution of one or more application programs with the data and/or presentation of the data to a user via one or more user interfaces 506. User interfaces 506 may include one or more screens, microphones, mice, touchpads, keyboards, or any other interface providing a mechanism for user input.

The communication processor 518 may include a digital signal processor and/or a controller which may direct such communication functionality of vehicle 400 according to the communication protocols associated with one or more radio access networks, and may execute control over antenna system 406 and RF transceiver(s) 408 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 400 shown in FIGS. 4 and 5 may depict only a single instance of such components.

Vehicle 400 may transmit and receive wireless signals with antenna system 406, which may be a single antenna or an antenna array that includes multiple antenna elements. In some aspects, antenna system 406 may additionally include analog antenna combination and/or beamforming circuitry. In the receive (RX) path, RF transceiver(s) 408 may receive analog radio frequency signals from antenna system 406 and perform analog and digital RF front-end processing on the analog radio frequency signals to produce digital baseband samples (e.g., In-Phase/Quadrature (IQ) samples) to provide to communication processor 518. RF transceiver(s) 408 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 408 may utilize to convert the received radio frequency signals to digital baseband samples. In the transmit (TX) path, RF transceiver(s) 408 may receive digital baseband samples from communication processor 518 and perform analog and digital RF front-end processing on the digital baseband samples to produce analog radio frequency signals to provide to antenna system 406 for wireless transmission. RF transceiver(s) 408 may thus include analog and digital transmission components including amplifiers (e.g., Power Amplifiers (PAs), filters, RF modulators (e.g., RF IQ modulators), and digital-to-analog converters (DACs), which RF transceiver(s) 408 may utilize to mix the digital baseband samples received from communication processor 518 and produce the analog radio frequency signals for wireless transmission by antenna system 406. In some aspects, communication processor 518 may control the radio transmission and reception of RF transceiver(s) 408, including specifying the transmit and receive radio frequencies for operation of RF transceiver(s) 408.

According to some aspects, communication processor 518 includes a baseband modem configured to perform physical layer (PHY, Layer 1) transmission and reception processing to, in the transmit path, prepare outgoing transmit data provided by communication processor 518 for transmission via RF transceiver(s) 408, and, in the receive path, prepare incoming received data provided by RF transceiver(s) 408 for processing by communication processor 518. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 400 may be configured to operate according to one or more radio communication technologies. The digital signal processor of the communication processor 518 may be responsible for lower-layer processing functions (e.g., Layer 1/PHY) of the radio communication technologies, while a controller of the communication processor 518 may be responsible for upper-layer protocol stack functions (e.g., Data Link Layer/Layer 2 and/or Network Layer/Layer 3). The controller may thus be responsible for controlling the radio communication components of vehicle 400 (antenna system 406, RF transceiver(s) 408, position device 414, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 400 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 400 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 518 may include executable instructions that define the logic of such functions.

In some aspects, vehicle 400 may be configured to transmit and receive data according to multiple radio communication technologies. Accordingly, in some aspects one or more of antenna system 406, RF transceiver(s) 408, and communication processor 518 may include separate components or instances dedicated to different radio communication technologies and/or unified components that are shared between different radio communication technologies. For example, in some aspects, multiple controllers of communication processor 518 may be configured to execute multiple protocol stacks, each dedicated to a different radio communication technology and either at the same processor or different processors. In some aspects, multiple digital signal processors of communication processor 518 may include separate processors and/or hardware accelerators that are dedicated to different respective radio communication technologies, and/or one or more processors and/or hardware accelerators that are shared between multiple radio communication technologies. In some aspects, RF transceiver(s) 408 may include separate RF circuitry sections dedicated to different respective radio communication technologies, and/or RF circuitry sections shared between multiple radio communication technologies. In some aspects, antenna system 406 may include separate antennas dedicated to different respective radio communication technologies, and/or antennas shared between multiple radio communication technologies. Accordingly, antenna system 406, RF transceiver(s) 408, and communication processor 518 can encompass separate and/or shared components dedicated to multiple radio communication technologies.

Communication processor 518 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 220 may be configured to transmit communications including communications (one-way or two-way) between the vehicle 400 and one or more other (target) vehicles in an environment of the vehicle 400 (e.g., to facilitate coordination of navigation of the vehicle 400 in view of or together with other (target) vehicles in the environment of the vehicle 400), or even a broadcast transmission to unspecified recipients in a vicinity of the transmitting vehicle 400.

Communication processor 518 may be configured to operate via a first RF transceiver of the one or more RF transceivers(s) 408 according to different desired radio communication protocols or standards. By way of example, communication processor 518 may be configured in accordance with a Short-Range mobile radio communication standard such as e.g. Bluetooth, Zigbee, among others, and the first RF transceiver may correspond to the corresponding Short-Range mobile radio communication standard. As another example, communication processor 518 may be configured to operate via a second RF transceiver of the one or more RF transceivers(s) 408 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP (3$^{rd}$ Generation Partnership Project) standards. As a further example, communication processor 518 may be configured to operate via a third RF transceiver of the one or more RF transceivers(s) 408 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, among others). The one or more RF transceiver(s) 408 may be configured to transmit signals via antenna system 406 over an air interface. The RF transceivers 408 may each have a corresponding antenna element of antenna system 406, or may share an antenna element of the antenna system 406.

Memory 106 may embody a memory component of vehicle 400, such as a hard drive or another such permanent memory device. Although not explicitly depicted in FIGS. 4 and 5, the various other components of vehicle 400, e.g. one or more processors 108, shown in FIGS. 4 and 5 may additionally each include integrated permanent and non-permanent memory components, such as for storing software program code, buffering data, etc.

The antenna system 406 may include a single antenna or multiple antennas. In some aspects, each of the one or more antennas of antenna system 406 may be placed at a plurality of locations on the vehicle 400 in order to ensure maximum RF coverage. The antennas may include a phased antenna array, a switch-beam antenna array with multiple antenna elements, etc. Antenna system 406 may be configured to operate according to analog and/or digital beamforming schemes in order to maximize signal gains and/or provide levels of information privacy. Antenna system 406 may include separate antennas dedicated to different respective radio communication technologies, and/or antennas shared between multiple radio communication technologies. While shown as a single element in FIG. 4, antenna system 406 may include a plurality of antenna elements (e.g., antenna arrays) positioned at different locations on vehicle 400. The placement of the plurality of antenna elements may be strategically chosen in order to ensure a desired degree of RF coverage. For example, additional antennas may be placed at the front, back, corner(s), and/or on the side(s) of the vehicle 400.

Each of the data acquisition units may be configured to observe a particular type of data of the vehicle's 400 environment and forward the data to the data acquisition processor 514 in order to provide the vehicle with an accurate portrayal of the vehicle's environment. The data acquisition devices 412 may be configured to implement pre-processed sensor data, such as radar target lists or LIDAR target lists, in conjunction with acquired data.

Measurement devices 416 may include other devices for measuring vehicle-state parameters, such as a velocity sensor (e.g., a speedometer) for measuring a velocity of the vehicle 400, one or more accelerometers (either single axis or multi-axis) for measuring accelerations of the vehicle 400 along one or more axes, a gyroscope for measuring orientation and/or angular velocity, odometers, altimeters, thermometers, a humidity sensor (e.g., a hygrometer) for measuring a humidity, a distance meter to measure a roughness of a ground, a pressure sensor for measuring a pressure in the surround of the vehicle 400, a torque sensor for measuring a torque of the vehicle 400, a steering angle sensor for measuring a steering angle or a turning angle of the vehicle 400, etc. It is appreciated that vehicle 400 may have different measurement devices 416 depending on the type of vehicle it is, e.g., car vs. drone vs. boat.

Position devices 414 may include components for determining a position of the vehicle 400. For example, this may include global position system (GPS) or other global navigation satellite system (GNSS) circuitry configured to receive signals from a satellite system and determine a position of the vehicle 400. Position devices 414, accordingly, may provide vehicle 400 with satellite navigation features.

The one or more memories 106 may store data, e.g., in a database or in any different format, that may correspond to a map. For example, the map may indicate a location of known landmarks, roads, paths, network infrastructure elements, or other elements of the vehicle's 400 environment. The one or more processors 108 may process sensory information (such as images, radar signals, depth information from LIDAR, or stereo processing of two or more images) of the environment of the vehicle 400 together with position information, such as a GPS coordinate, a vehicle's ego-motion, etc., to determine a current location of the vehicle 400 relative to the known landmarks, and refine the determination of the vehicle's location. Certain aspects of this technology may be included in a localization technology such as a mapping and routing model.

The map database (DB) 504 may include any type of database storing (digital) map data for the vehicle 400, e.g., for the control system 500. The map database 504 may include data relating to the position, in a reference coordinate system, of various items, including roads, water features, geographic features, businesses, points of interest, restaurants, gas stations, etc. The map database 504 may store not only the locations of such items, but also descriptors relating to those items, including, for example, names associated with any of the stored features. In some aspects, a processor of the one or more processors 108 may download information from the map database 504 over a wired or wireless data connection to a communication network (e.g., over a cellular network and/or the Internet, etc.). In some cases, the map database 504 may store a sparse data model including polynomial representations of certain road features (e.g., lane markings) or target trajectories for the vehicle 400. The map database 504 may also include stored representations of various recognized landmarks that may be provided to determine or update a known position of the vehicle 400 with respect to a target trajectory. The landmark representations may include data fields such as landmark type, landmark location, among other potential identifiers.

Furthermore, the control system 500 may include a driving model, e.g., implemented in an advanced driving assistance system (ADAS) and/or a driving assistance and automated driving system. By way of example, the control system 500 may include (e.g., as part of the driving model) a computer implementation of a formal model such as a safety driving model. The control system 500 may be or may include a safety system 500 and may include (e.g., as part of the driving model) a computer implementation of a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 400 may include the control system 500 as also described with reference to FIG. 5. The vehicle 400 may include the one or more processors 108 integrated with or separate from an engine control unit (ECU) which may be included in the mobility system 420 of the vehicle 400. The control system 500 may, in general, generate data to control or assist to control the ECU and/or other components of the vehicle 400 to directly or indirectly control the movement of the vehicle 400 via mobility system 420. The one or more processors 108 of the vehicle 400 may be configured to implement the aspects and methods described herein.

Figure 5:
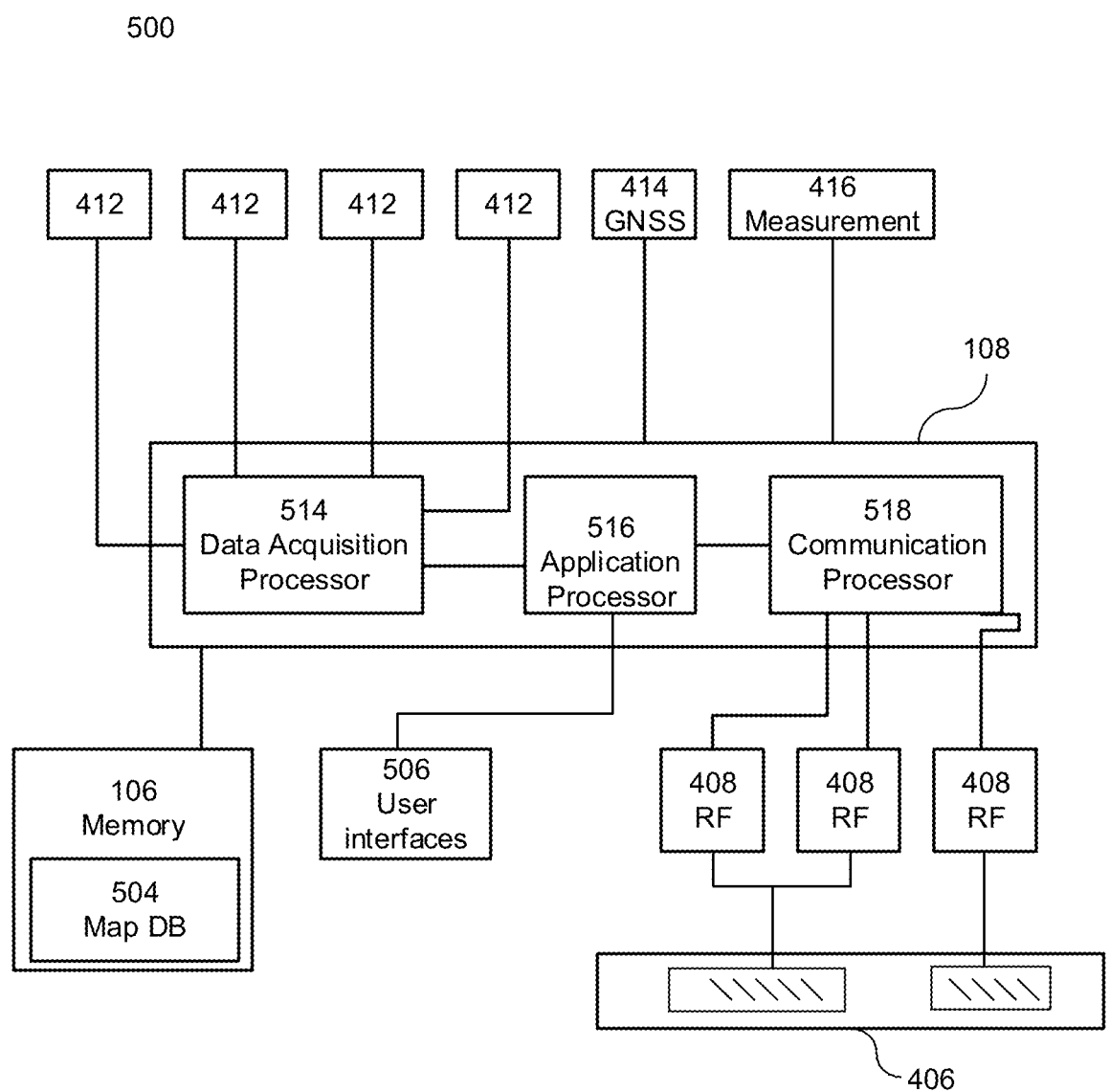
FIG. 5 shows various exemplary electronic components of a safety system of the vehicle in accordance with various aspects of the disclosure.

The components illustrated in FIGS. 4 and 5 may be operatively connected to one another via any appropriate interfaces. Furthermore, it is appreciated that not all the connections between the components are explicitly shown, and other interfaces between components may be covered within the scope of this disclosure.

The vehicle 400 may further include an object detection system. The object detection system may include an object detection model, such as the object detection model 208, configured to detect at least one object in the surrounding of the vehicle 400. The detected object may be any kind of object in the surrounding of a vehicle, such as other vehicles, pedestrians, trees, sidewalks, streets, cyclists, pets, wild animals, etc. The object detection model may be a trained object detection model and may have been trained by the method 300. The vehicle 400 may further include the processing system 200.

The safety system 500 may be configured to provide control instructions based on the detected at least one object. For example, the safety driving model may provide control instructions using the data provided by the object detection model (e.g., information about the at least one detected object). The mobility system 420 may be configured to control the vehicle 400 in accordance with the control instructions provided by the safety system 500.

In the following, various aspects of the disclosure will be illustrated:

Example 1 is a training device. The training device may include one or more processors. The one or more processors may be configured to generate, using a data augmentation model, augmented sensor data for sensor data. The sensor data may be provided by a plurality of sensors. The augmented sensor data may include error states of one or more sensors of the plurality of sensors providing the sensor data. The one or more processors may be further configured to train an object detection model based on the augmented sensor data.

Thereby, the trained object detection model is capable to cope with faulty input data, such as erroneous sensor data, and/or missing input data, for example due to a malfunctioning sensor (e.g., broken sensor) or a malfunction sensor module. Thus, the trained object detection model may be capable to compensate faults such as system failures due to the faulty or missing input data may be prevented. Hence, the redundancy of single information (e.g., data provided by one sensor) is leveraged and the robustness against systematic or random failures, such as sensor-related failures, is increased. Furthermore, no reconfiguration during the runtime of the trained object detection model is necessary. Thereby, the trained object detection model can be applied in realtime.

In Example 2, the subject matter of Example 1 can optionally include that the sensor data include a plurality of sensor data items, and that each sensor data item of the plurality of sensor data items is associated with one sensor of the plurality of sensors. The augmented sensor data may include a plurality of augmented data items, and each augmented data item may be associated to a sensor data item of the plurality of sensor data items.

In Example 3, the subject matter of Example 1 or 2 can optionally include that the error states include one or more of: weather conditions, an occlusion, sensor data noise, a sensor saturation, a sensor bias, a drift, and/or a scaling.

In Example 4, the subject matter of any one of Examples 1 to 3 can optionally include that the sensor data include information about at least one object.

In Example 5, the subject matter of Example 4 can optionally include that each sensor data item of the plurality of sensor data items includes a plurality of elements, and that one or more elements of the plurality of elements are associated with the at least one object.

In Example 6, the subject matter of Example 5 can optionally include that at least one sensor data item is an image, that each element of the plurality of elements of the sensor data item is a pixel of a plurality of pixels of the image, and that one or more pixels of the plurality of pixels are associated with the at least one object.

In Example 7, the subject matter of Example 5 or 6 can optionally include that at least one sensor data item is a point cloud, that each element of the plurality of elements of the sensor data item is a point of a plurality of points of the point cloud, and that one or more points of the plurality of points are associated with the at least one object.

In Example 8, the subject matter of any one of Examples 5 to 7 can optionally include that at least one sensor data item is a target list, that each element of the plurality of elements of the sensor data item is a target item of a plurality of target items in the target list, and that one or more target items of the plurality of target items are associated with the at least one object.

In Example 9, the subject matter of any one of Examples 1 to 8 can optionally include that the object detection model includes a plurality of feature extraction models, and that the one or more processors are configured to determine, based on the plurality of feature extraction models, a plurality of features for the augmented sensor data, and train the object detection model based on the plurality of features.

In Example 10, the subject matter of Example 9 can optionally include that the features describe the at least one object.

In Example 11, the subject matter of any one of Examples 5 to 10 can optionally include that the sensor data include information about a plurality of objects and that one or more elements of the plurality of elements of each sensor data item of the plurality of sensor data items are associated to at least one object of the plurality of objects.

In Example 12, the subject matter of any one of Examples 9 to 11 can optionally include that each feature extraction model of the plurality of feature extraction models is associated to at least one sensor of the plurality of sensors.

In Example 13, the subject matter of any one of Examples 9 to 12 can optionally include that the plurality of feature extraction models includes at least one of: a convolutional feature extraction, a spatial point feature extraction, and/or a feature encoder.

In Example 14, the subject matter of any one of Examples 9 to 13 can optionally include that the one or more processors are configured to train the object detection model by suppressing one or more selected features of the plurality of features.

Thereby, the trained object detection model is capable to cope with missing input data, for example due to a broken sensor or a broken sensor module. Thus, the trained object detection model may be capable to compensate faults due to missing input data and system failures may be prevented. Hence, the redundancy of single information (e.g., data provided by one sensor) is leveraged and the robustness against sensor failures is increased.

In Example 15, the subject matter of Example 14 can optionally include that the one or more selected features include all features associated to one or more selected sensors.

In Example 16, the subject matter of Example 14 or 15 can optionally include that the one or more processors are configured to randomly select the one or more selected sensors of the plurality of sensors.

In Example 17, the subject matter of Example 15 or 16 can optionally include that the one or more processors are configured to fuse the plurality of features except for the selected features to fused features, and to train the object detection model using the fused features.

In Example 18, the subject matter of any one of Examples 9 to 17 can optionally include that the one or more processors are configured to determine, based on the plurality of feature extraction models, a plurality of feature vectors for the sensor data provided by the plurality of sensors. Each feature vector of the plurality of feature vectors may be associated with one sensor of the plurality of sensors, and each feature vector of the plurality of feature vectors may include one or more features. The one or more processors may be further configured to fuse the plurality of feature vectors.

In Example 19, the subject matter of Example 18 can optionally include that the one or more processors are configured to fuse the plurality of feature vectors except for the feature vectors associated with the one or more selected sensors to the fused feature vector.

In Example 20, the subject matter of Example 18 or 19 can optionally include that the one or more processors are configured to concatenate the plurality of feature vectors to the fused feature vector.

In Example 21, the subject matter of any one of Examples 18 to 20 can optionally include that each feature vector of the plurality of feature vectors includes a plurality of feature values, that each feature value of a feature vector is associated to at least one feature value of the other feature vectors of the plurality of feature vectors, and that the one or more processors are configured to fuse the plurality of feature vectors by selecting a maximum feature value for each set of associated feature values and/or an average feature value for each set of associated feature values.

In Example 22, the subject matter of Example 5 and any one of Examples 18 to 21 can optionally include that the one or more processors are configured to generate, based on the object detection model, a class probability map using the fused feature vector. The class probability map may include for each element of the plurality of elements of at least one sensor data item of the sensor data a probability of each class of a plurality of classes. The one or more processors may be further configured to train the object detection model using the generated class probability map.

In Example 23, the subject matter of Example 22 can optionally include that the one or more processors are configured to generate training data. The training data may include a training class for each element of the plurality of elements of the at least one sensor data item. The one or more processors may be further configured to train the object detection model using the generated training data and the generated class probability map.

In Example 24, the subject matter of Example 5 and any one of Examples 18 to 23 can optionally include that the one or more processors are configured to generate, based on the object detection model, at least one bounding box for at least one augmented sensor data item using the fused feature vector. The at least one bounding box may include one or more elements of the one or more elements associated to the at least one object in the associated sensor data item. The one or more processors may be further configured to train the object detection model using the at least one bounding box.

In Example 25, the subject matter of Example 24 can optionally include that the one or more processors are configured to generate training data, and that the training data include at least one training bounding box. The at least one training bounding box may include each element of the one or more elements associated to the at least one object. The one or more processors may be further configured to train the object detection model using the generated training data and the generated at least one bounding box.

In Example 26, the subject matter of any one of Examples 1 to 25 can optionally include that the one or more processors are configured to determine, based on the object detection model, a detection uncertainty of the at least one object, and to train the object detection model using the determined detection uncertainty.

In Example 27, the subject matter of Example 26 can optionally include that the one or more processors are configured to generate training data, and that the training data include information about the at least one object. The one or more processors may be further configured to determine a training detection uncertainty for the at least one object using the training data, and to train the object detection model using the determined training detection uncertainty and the determined detection uncertainty.

In Example 28, the subject matter of any one of Examples 1 to 27 can optionally include that the object detection model is or includes a neural network (e.g., a convolutional neural network, e.g., a region proposal network).

Example 29 is a system including a plurality of sensors configured to provide sensor data, and a device including one or more processors. The one or more processors may be configured to generate, using a data augmentation model, augmented sensor data for the sensor data and to train an object detection model based on the augmented sensor data. The augmented sensor data may include error states of one or more sensors of the plurality of sensors.

Example 30 is a device including one or more processors. The one or more processors are configured to generate, using a data augmentation model, augmented sensor data for sensor data. The sensor data may be provided by a plurality of sensors. The augmented sensor data may include error states of one or more sensors of the plurality of sensors providing the sensor data. The one or more processors may be further configured to train an object detection model based on the augmented sensor data, to generate training data using the trained object detection model, and to train an additional model using the training data.

Example 31 is a system including a plurality of sensors configured to provide sensor data, and a device comprising one or more processors. The one or more processors are configured to generate, using a data augmentation model, augmented sensor data for sensor data. The sensor data may be provided by a plurality of sensors. The augmented sensor data may include error states of one or more sensors of the plurality of sensors providing the sensor data. The one or more processors may be further configured to train an object detection model based on the augmented sensor data, to generate training data using the trained object detection model, and to train an additional model using the training data.

Example 32 is a vehicle including a mobility system configured to control the vehicle to operate in accordance with provided control instructions, a plurality of sensors configured to provide sensor data, and an object detection system, including an object detection model configured to detect at least one object in the surrounding of the vehicle based on the sensor data. The object detection model has been trained by a training method and the training method may include generating, using a data augmentation model, augmented sensor data for training sensor data and training the object detection model based on the augmented sensor data. The training sensor data may be provided by the plurality of sensors, and the augmented sensor data may include error states of one or more sensors of the plurality of sensors. The vehicle may further include a safety system, configured to provide control instructions based on the detected at least one object.

Example 33 is a production system including a plurality of sensors configured to provide sensor data, and an object detection system, including an object detection model configured to detect at least product in the production system based on the sensor data. The object detection model has been trained by a training method and the training method may include generating, using a data augmentation model, augmented sensor data for training sensor data, and training an object detection model based on the augmented sensor data. The training sensor data may be provided by the plurality of sensors, and the augmented sensor data may include error states of one or more sensors of the plurality of sensors. The production system may further include a control system configured to provide control instructions based on the detected at least one object and to control the production system to operate in accordance with provided control instructions.

Example 34 is a computer program element including instructions which, when executed by one or more processors, cause the one or more processors to generate, using a data augmentation model, augmented sensor data for sensor data, and to train an object detection model based on the augmented sensor data. The sensor data may be provided by a plurality of sensors, and the augmented sensor data may include error states of one or more sensors of the plurality of sensors providing the sensor data.

Example 35 is a non-volatile computer-readable medium having instructions recorded thereon which, when executed by one or more processors, cause the one or more processors to generate, using a data augmentation model, augmented sensor data for sensor data, and to train an object detection model based on the augmented sensor data. The sensor data may be provided by a plurality of sensors, and the augmented sensor data may include error states of one or more sensors of the plurality of sensors providing the sensor data.

Example 36 is a non-transitory computer-readable medium having instructions recorded thereon which, when executed by one or more processors, cause the one or more processors to generate, using a data augmentation model, augmented sensor data for sensor data, and to train an object detection model based on the augmented sensor data. The sensor data may be provided by a plurality of sensors, and the augmented sensor data may include error states of one or more sensors of the plurality of sensors providing the sensor data.

Example 37 is a method of computer-implemented training an object detection model. The method includes generating, using a data augmentation model, augmented sensor data for sensor data, and training an object detection model based on the augmented sensor data. The sensor data may be provided by a plurality of sensors, and the augmented sensor data may include error states of one or more sensors of the plurality of sensors providing the sensor data.

In Example 38, the subject matter of Example 37 can optionally include that the sensor data include a plurality of sensor data items, and that each sensor data item of the plurality of sensor data items is associated with one sensor of the plurality of sensors. The augmented sensor data may include a plurality of augmented data items, and each augmented data item may be associated to a sensor data item of the plurality of sensor data items.

In Example 39, the subject matter of Example 37 or 38 can optionally include that the error states include one or more of: weather conditions, an occlusion, sensor data noise, a sensor saturation, a sensor bias, a drift, and/or a scaling.

In Example 40, the subject matter of any one of Examples 37 to 39 can optionally include that the sensor data include information about at least one object.

In Example 41, the subject matter of Example 40 can optionally include that each sensor data item of the plurality of sensor data items includes a plurality of elements, and that one or more elements of the plurality of elements are associated with the at least one object.

In Example 42, the subject matter of Example 41 can optionally include that at least one sensor data item is an image, that each element of the plurality of elements of the sensor data item is a pixel of a plurality of pixels of the image, and that one or more pixels of the plurality of pixels are associated with the at least one object.

In Example 43, the subject matter of Example 41 or 42 can optionally include that at least one sensor data item is a point cloud, that each element of the plurality of elements of the sensor data item is a point of a plurality of points of the point cloud, and that one or more points of the plurality of points are associated with the at least one object.

In Example 44, the subject matter of any one of Examples 41 to 43 can optionally include that at least one sensor data item is a target list, that each element of the plurality of elements of the sensor data item is a target item of a plurality of target items in the target list, and that one or more target items of the plurality of target items are associated with the at least one object.

In Example 45, the subject matter of any one of Examples 37 to 44 can optionally include that the object detection model includes a plurality of feature extraction models, and that training the object detection model includes determining, based on the plurality of feature extraction models, a plurality of features for the augmented sensor data, and training the object detection model based on the plurality of features.

In Example 46, the subject matter of Example 45 can optionally include that the features describe the at least one object.

In Example 47, the subject matter of any one of Examples 41 to 46 can optionally include that the sensor data include information about a plurality of objects and that one or more elements of the plurality of elements of each sensor data item of the plurality of sensor data items are associated to at least one object of the plurality of objects.

In Example 48, the subject matter of any one of Examples 45 to 47 can optionally include that each feature extraction model of the plurality of feature extraction models is associated to at least one sensor of the plurality of sensors.

In Example 49, the subject matter of any one of Examples 45 to 48 can optionally include that the plurality of feature extraction models includes at least one of: a convolutional feature extraction, a spatial point feature extraction, and/or a feature encoder.

In Example 50, the subject matter of any one of Examples 45 to 49 can optionally include that training the object detection model based on the plurality of features includes training the object detection model by suppressing one or more selected features of the plurality of features.

In Example 51, the subject matter of Example 50 can optionally include that the one or more selected features include all features associated to one or more selected sensors.

In Example 52, the subject matter of Example 50 or 51 can optionally include that the one or more selected sensors of the plurality of sensors are randomly selected.

In Example 53, the subject matter of Example 51 or 52 can optionally include that training the object detection model includes fusing the plurality of features except for the selected features to fused features, and training the object detection model using the fused features.

In Example 54, the subject matter of any one of Examples 45 to 53 can optionally include that training the object detection model includes determining, based on the plurality of feature extraction models, a plurality of feature vectors for the sensor data provided by the plurality of sensors. Each feature vector of the plurality of feature vectors may be associated with one sensor of the plurality of sensors, and each feature vector of the plurality of feature vectors may include one or more features. Training the object detection model may further include fusing the plurality of feature vectors.

In Example 55, the subject matter of Example 54 can optionally include fusing the plurality of feature vectors includes fusing the plurality of feature vectors except for the feature vectors associated with the one or more selected sensors to the fused feature vector.

In Example 56, the subject matter of Example 54 or 55 can optionally include that fusing the plurality of feature vectors includes concatenating the plurality of feature vectors to the fused feature vector.

In Example 57, the subject matter of any one of Examples 54 to 56 can optionally include that each feature vector of the plurality of feature vectors includes a plurality of feature values, that each feature value of a feature vector is associated to at least one feature value of the other feature vectors of the plurality of feature vectors, and that the one or more processors are configured to fuse the plurality of feature vectors by selecting a maximum feature value for each set of associated feature values and/or an average feature value for each set of associated feature values.

In Example 58, the subject matter of Example 41 and any one of Examples 54 to 57 can optionally include that training the object detection model includes generating, based on the object detection model, a class probability map using the fused feature vector, and training the object detection model using the generated class probability map. The class probability map may include for each element of the plurality of elements of at least one sensor data item of the sensor data a probability of each class of a plurality of classes.

In Example 59, the subject matter of Example 58 can optionally include that training the object detection model includes training the object detection model using training data and the generated class probability map. The training data may include a training class for each element of the plurality of elements of the at least one sensor data item.

In Example 60, the subject matter of Example 41 and any one of Examples 54 to 59 can optionally include that training the object detection model includes generating, based on the object detection model, at least one bounding box for at least one augmented sensor data item using the fused feature vector, and training the object detection model using the at least one bounding box. The at least one bounding box may include one or more elements of the one or more elements associated to the at least one object in the associated sensor data item.

In Example 61, the subject matter of Example 60 can optionally include that training the object detection model includes training the object detection model using generated training data and the generated at least one bounding box. The training data include at least one training bounding box. The at least one training bounding box may include each element of the one or more elements associated to the at least one object.

In Example 62, the subject matter of any one of Examples 37 to 61 can optionally include that the method further includes determining, based on the object detection model, a detection uncertainty of the at least one object, and training the object detection model using the determined detection uncertainty.

In Example 63, the subject matter of Example 62 can optionally include that training the object detection model using the determined detection uncertainty includes generating training data, the training data including information about the at least one object, determining a training detection uncertainty for the at least one object using the training data, and training the object detection model using the determined training detection uncertainty and the determined detection uncertainty.

In Example 64, the subject matter of any one of Examples 37 to 63 can optionally include that the object detection model is or includes a neural network (e.g., a convolutional neural network, e.g., a region proposal network).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A training device, comprising:
one or more processors, configured to:
generate, using a data augmentation model, augmented sensor data for sensor data, the sensor data provided by a plurality of sensors, wherein the augmented sensor data comprise error states of one or more sensors of the plurality of sensors providing the sensor data; and
train an object detection model based on the augmented sensor data, wherein the object detection model comprises a plurality of feature extraction models, and wherein the one or more processors are configured to:
determine, based on the plurality of feature extraction models, a plurality of features for the augmented sensor data; and
train the object detection model based on the plurality of features, wherein the one or more processors are configured to train the object detection model by suppressing one or more selected features of the plurality of features, wherein the one or more selected features comprises all features associated with one or more selected sensors.

2. The training device of claim 1, wherein the error states comprise one or more of: weather conditions, an occlusion, sensor data noise, a sensor saturation, a sensor bias, a drift, and/or a scaling.

3. The training device of claim 1, wherein the one or more processors are configured to randomly select the one or more selected features of the plurality of features.

4. The training device of claim 1, wherein the sensor data comprise information about at least one object, wherein each sensor data item of the plurality of sensor data items comprises a plurality of elements, and wherein one or more elements of the plurality of elements are associated with the at least one object.

5. The training device of claim 1, wherein the object detection model comprises a neural network.

6. The training device of claim 1, wherein the one or more processors are further configured to:
determine, based on the plurality of feature extraction models, a plurality of feature vectors for the sensor data provided by the plurality of sensors;
fuse the plurality of feature vectors except for the feature vectors associated with the one or more selected sensors to a fused feature vector; and
train the object detection model using the fused feature vector.

7. The training device of claim 1, wherein the plurality of feature extraction models includes a convolutional feature extraction, a spatial point feature extraction, a feature encoder, or any combination of these.

8. The training device of claim 4, wherein the object detection model comprises a plurality of feature extraction models, and wherein the one or more processors are configured to determine, based on the plurality of feature extraction models, a plurality of features for the augmented sensor data, and to train the object detection model based on the plurality of features, wherein the features describe the at least one object.

9. The training device of claim 8, wherein the one or more processors are configured to fuse the plurality of features to fused features, and to train the object detection model using the fused features.

10. The training device of claim 8, wherein the one or more processors are configured to train the object detection model by suppressing one or more selected features of the plurality of features, to fuse the plurality of features except for the selected features to fused features, and to train the object detection model using the fused features.

11. The training device of claim 8, wherein the one or more processors are configured to:
determine, based on the object detection model, a detection uncertainty of the at least one object; and
train the object detection model using the determined detection uncertainty.

12. The training device of claim 9, wherein the one or more processors are configured to:
generate, based on the object detection model, a class probability map using the fused features, wherein the class probability map comprises for each element of the plurality of elements of at least one sensor data item of the sensor data a probability of each class of a plurality of classes; and
train the object detection model using the generated class probability map.

13. The training device of claim 9, wherein the one or more processors are configured to:
generate, based on the object detection model, at least one bounding box for at least one augmented sensor data item using the fused features, wherein the at least one bounding box comprises one or more elements of the one or more elements associated to the at least one object in the associated sensor data item; and
train the object detection model using the at least one bounding box.

14. The training device of claim 10, wherein the one or more processors are configured to:
generate, based on the object detection model, a class probability map using the fused features, wherein the class probability map comprises for each element of the plurality of elements of at least one sensor data item of the sensor data a probability of each class of a plurality of classes;
generate, based on the object detection model, at least one bounding box for at least one augmented sensor data item using the fused features, wherein the at least one bounding box comprises one or more elements of the one or more elements associated to the at least one object in the associated sensor data item; and
train the object detection model using the generated class probability map and the generated at least one bounding box.

15. The training device of claim 11, wherein the one or more processors are configured to:
generate training data, wherein the training data comprise information about the at least one object;
determine a training detection uncertainty for the at least one object using the training data;
train the object detection model using the determined training detection uncertainty and the determined detection uncertainty.

16. The training device of claim 12, the one or more processors are configured to:
generate training data, wherein the training data comprise a training class for each element of the plurality of elements of the at least one sensor data item;

train the object detection model using the generated training data and the generated class probability map.

17. The training device of claim 13, wherein the one or more processors are configured to:
generate training data, wherein the training data comprise at least one training bounding box, wherein the at least one training bounding box comprises each element of the one or more elements associated to the at least one object;
train the object detection model using the generated training data and the generated at least one bounding box.

18. A device, comprising one or more processors, the one or more processors configured to:
generate, using a data augmentation model, augmented sensor data for sensor data, the sensor data provided by a plurality of sensors, wherein the augmented sensor data comprise error states of one or more sensors of the plurality of sensors providing the sensor data;
train an object detection model based on the augmented sensor data, wherein the object detection model comprises a plurality of feature extraction models, and wherein the one or more processors are configured to:
determine, based on the plurality of feature extraction models, a plurality of features for the augmented sensor data; and
train the object detection model based on the plurality of features, wherein the one or more processors are configured to train the object detection model by suppressing one or more selected features of the plurality of features, wherein the one or more selected features comprises all features associated to one or more selected sensors;
generate training data using the trained object detection model; and
train an additional model using the training data.

19. A non-transitory computer-readable medium comprising instructions recorded thereon which, when executed by one or more processors, cause the one or more processors to:
generate, using a data augmentation model, augmented sensor data for sensor data, the sensor data provided by a plurality of sensors, wherein the augmented sensor data comprise error states of one or more sensors of the plurality of sensors providing the sensor data; and
train an object detection model based on the augmented sensor data, wherein the object detection model comprises a plurality of feature extraction models, and wherein the one or more processors are configured to:
determine, based on the plurality of feature extraction models, a plurality of features for the augmented sensor data; and
train the object detection model based on the plurality of features, wherein the one or more processors are configured to train the object detection model by suppressing one or more selected features of the plurality of features, wherein the one or more selected features comprises all features associated with one or more selected sensors.

20. A non-transitory computer-readable medium comprising instructions recorded thereon which, when executed by one or more processors, cause the one or more processors to:
generate, using a data augmentation model, augmented sensor data for sensor data, the sensor data provided by a plurality of sensors, wherein the augmented sensor data comprise error states of one or more sensors of the plurality of sensors providing the sensor data; and
train an object detection model based on the augmented sensor data, wherein the object detection model comprises a plurality of feature extraction models, and wherein the one or more processors are configured to:
determine, based on the plurality of feature extraction models, a plurality of features for the augmented sensor data; and
train the object detection model based on the plurality of features, wherein the one or more processors are configured to train the object detection model by suppressing one or more selected features of the plurality of features, wherein the one or more selected features comprises all features associated with one or more selected sensors;
generate training data using the trained object detection model; and
train an additional model using the training data.

* * * * *